(12) United States Patent
Cusmariu

(10) Patent No.: US 8,200,731 B1
(45) Date of Patent: Jun. 12, 2012

(54) DEVICE FOR DETERMINING A COHERENCE MEASUREMENT FOR A DIGITAL SIGNAL THAT DOES NOT REQUIRE SPECTRAL ESTIMATION

(75) Inventor: Adolf Cusmariu, Eldersburg, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 874 days.

(21) Appl. No.: 12/313,397

(22) Filed: Nov. 20, 2008

(51) Int. Cl.
*G06F 17/40* (2006.01)
*G06F 17/15* (2006.01)
*G03B 27/68* (2006.01)

(52) U.S. Cl. ........... 708/422; 708/102; 708/322; 355/52

(58) Field of Classification Search .................. None
See application file for complete search history.

(56) References Cited

U.S. PATENT DOCUMENTS

| 6,580,492 B2 | 6/2003 | Fujimoto |
| 6,992,779 B2 | 1/2006 | Ueki |
| 7,724,948 B2 * | 5/2010 | Payton ........................... 382/166 |

\* cited by examiner

*Primary Examiner* — Tammara Peyton
(74) *Attorney, Agent, or Firm* — Robert D. Morelli

(57) ABSTRACT

A device for and method of determining a coherence measurement for a signal that includes a digitizer for digitizing the signal, a transformer connected to the digitizer, a first squarer connected to the transformer, a second squarer connected to the digitizer, an adder connected to the first squarer and the second squarer, a subtractor connected to the first squarer and the second squarer, a standard-deviation function block connected to the subtractor, a mean generator connected to the adder, a first multiplier connected to the standard-deviation function block, and a divider connected to the output of the mean generator and the first multiplier.

4 Claims, 4 Drawing Sheets

DEVICE FOR DETERMINING A COHERENCE MEASUREMENT FOR A DIGITAL SIGNAL THAT DOES NOT REQUIRE SPECTRAL ESTIMATION

FIELD OF INVENTION

The present invention relates, in general, to electrical computers concerning arithmetic processing and calculating and, in particular, to electrical digital calculating computer.

BACKGROUND OF THE INVENTION

In optics, coherence is a measurement of how closely two signals compare, or correlate, to each other or how closely a signal compares to itself. Prior art methods of measuring coherence between two signals or of one signal involved frequency analysis and calculations of the power spectral densities. There is, however, a need for a device for and method of signal coherence measurement that is better suited to digital signal processing techniques that does not require spectral estimation.

(U) U.S. Pat. No. 6,580,492, entitled "RETICLE SYSTEM FOR MEASUREMENT OF EFFECTIVE COHERENCE FACTORS," discloses an optical method of measuring coherence. U.S. Pat. No. 6,580,492 is hereby incorporated by reference into the specification of the present invention.

(U) U.S. Pat. No. 6,992,779, entitled "INTERFEROMETER APPARATUS FOR BOTH LOW AND HIGH COHERENCE MEASUREMENT AND METHOD THEREOF," discloses an optical method of measuring coherence. U.S. Pat. No. 6,992,779 is hereby incorporated by reference into the specification of the present invention.

SUMMARY OF THE INVENTION

It is an object of the present invention to measure coherence using techniques more suited to digital signal processing and to avoid using frequency analysis or the calculation of power spectral density.

The present invention is a device for and method of measuring coherence using digital signal processing techniques.

The present invention includes a digitizer for receiving and digitizing the signal to be measured.

The present invention includes a transformer connected to the digitizer for transforming the digitized signal.

The present invention includes a first squarer connected to the transformer for squaring the transformed signal.

The present invention includes a second squarer connected to the digitizer for squaring the digitized signal.

The present invention includes an adder connected to the first squarer and the second squarer for adding the squared transformed signal and the squared digitized signal.

The present invention includes a subtractor connected to the first squarer and the second squarer for subtracting the squared transformed signal from the squared digitized signal.

The present invention includes a standard-deviation function block connected to the subtractor for determining the standard deviation of the output of the subtractor.

The present invention includes a mean generator connected to the adder for determining the mean of the output of the adder.

The present invention includes a first multiplier connected to the standard-deviation function block for multiplying the output of the standard-deviation function block.

The present invention includes a divider connected to the mean generator and the first multiplier for dividing the output of the mean generator by the output of the first multiplier to produce a measurement of the coherence of the signal received by the digitizer.

DETAILED DESCRIPTION

The present invention is a device for and method of measuring coherence of a signal using techniques more suited for digital signal processing and does not include a frequency analysis or the calculation of power density spectral.

Figure 1:
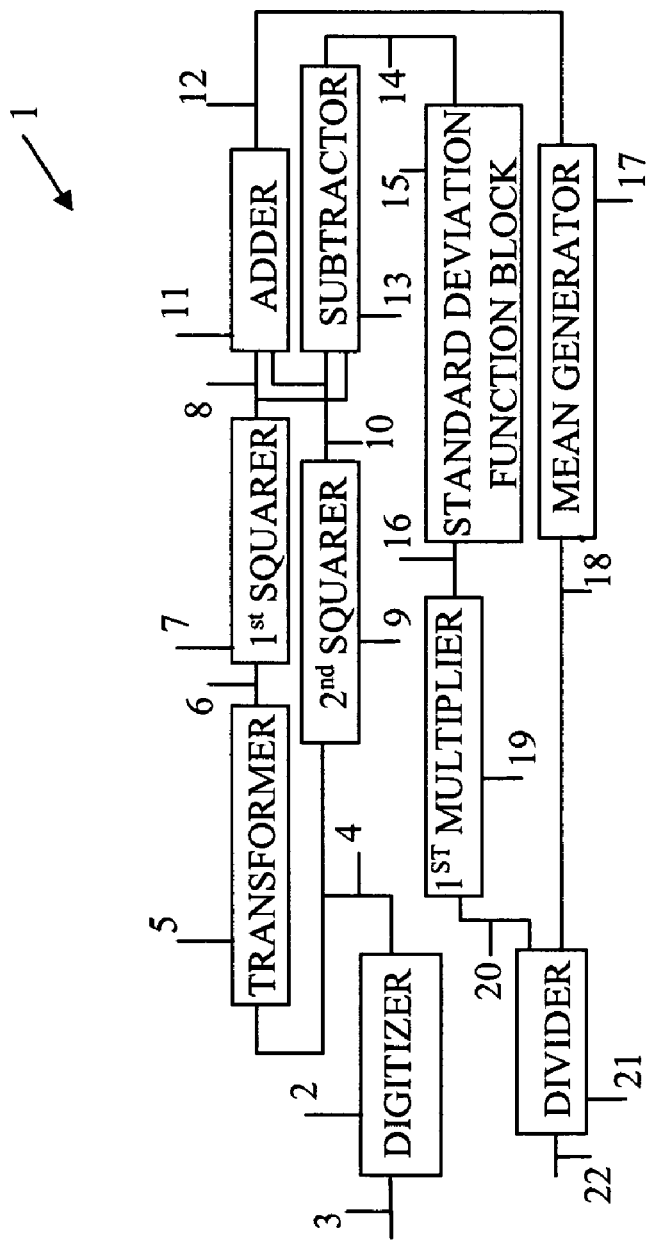
FIG. 1 is a schematic of the device of the present invention.

FIG. 1 is a schematic of the device 1 of the present invention.

The device 1 includes a digitizer 2, having an input 3 and an output 4. The input 3 receives a signal to be measured for coherence. The digitizer 2 digitizes the received signal. A digitized version of the received signal appears at the output 4 of the digitizer 2.

The device 1 includes a transformer 5, having an input and an output 6. The input of the transformer 5 is connected to the output 4 of the digitizer 2. The transformer 5 transforms the digitized signal to a companion signal that will be compared against the digitized signal to determine the coherence of the received signal. The transformed signal appears at the output 6 of the transformer 5. In the preferred embodiment, the transformer 5 is selected from the group of transformers consisting of Hilbert Transformer and Differentiator Transformer.

The device 1 includes a first squarer 7, having an input and an output 8. The input of the first squarer 7 is connected to the output 6 of the transformer 5. The first squarer 7 squares (i.e., raises to a power of two) the output 6 of the transformer 5. The squared version of the transformed signal appears at the output 8 of the first squarer 7.

The device 1 includes a second squarer 9, having an input and an output 10. The input of the second squarer 9 is connected to the output 4 of the digitizer 2. The second squarer 9 squares the output 4 of the digitizer 2. The squared version of the digitized signal appears at the output 10 of the second squarer 9.

The device 1 includes an adder 11, having a first input, a second input, and an output 12. The first input of the adder 11 is connected to the output 8 of the first squarer 7. The second input of the adder 11 is connected to the output 10 of the second squarer 9. The adder 11 adds the output 8 of the first squarer 7 and the output 10 of the second squarer. The resulting sum appears at the output 12 of the adder 11.

The device 1 includes a subtractor 13, having a first input, a second input, and an output 14. The first input of the subtractor 13 is connected to the output 8 of the first squarer 7. The second input of the subtractor 13 is connected to the output 10 of the second squarer 9. The subtractor 13 subtracts the squared transformed signal from the squared digitized signal. The resulting difference appears at the output 14 of the subtractor 13.

The device 1 includes a standard-deviation function block 15, having an input and an output 16. The input of the standard-deviation function block 15 is connected to the output 14 of the subtractor 13. The standard-deviation function block 15 determines the standard deviation of the output of the subtractor 13. The resulting standard deviation appears at the output 16 of the standard-deviation function block 15.

The device 1 includes a mean generator 17, having an input and an output 18. The input of the mean generator 17 is connected to the output 12 of the adder 11. The mean generator 17 determines the mean of the output 12 of the adder 11. The resulting mean appears at the output 18 of the mean generator 17.

The device 1 includes a first multiplier 19, having an input and an output 20. The input of the first multiplier 19 is connected to the output 16 of the standard-deviation function block 15. The first multiplier 19 multiplies the output of the standard-deviation function block 15 by the square root of two. The resulting product appears at the output 20 of the first multiplier 19.

The device 1 includes a divider 21, having a first input, a second input, and an output 22. The first input of the divider 21 is connected to the output 18 of the mean generator 17. The second input of the divider 21 is connected to the output 20 of the first multiplier 19. The divider 21 divides the output 18 of the mean generator 17 by the output 20 of the first multiplier 19. The resulting quotient, which is a measurement of the coherence present in the received signal, appears at the output 22 of the divider 21.

Figure 2:
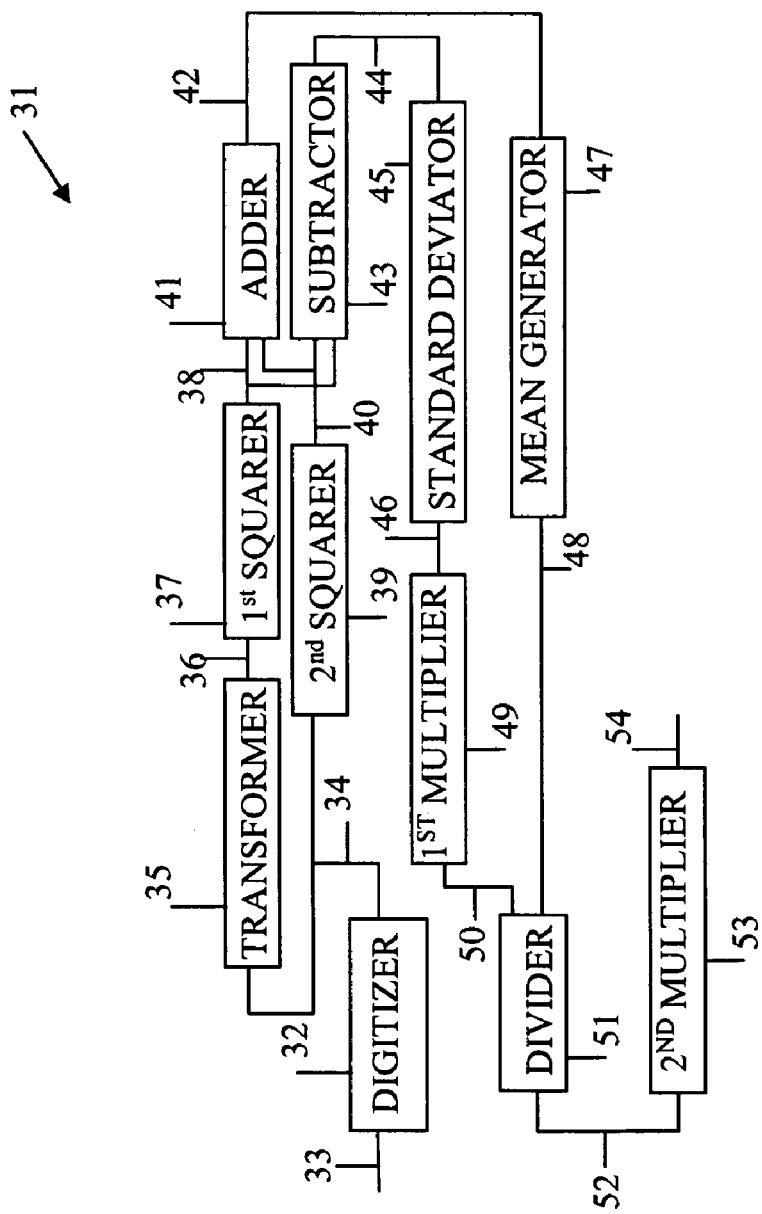
FIG. 2 is a schematic of an alternate device of the present invention.

FIG. 2 is a schematic of an alternate embodiment 31 of the present invention.

The alternate embodiment 31 includes a digitizer 32, having an input 33 and an output 34. The input 33 receives a signal to be measured for coherence. The digitizer 32 digitizes the received signal. A digitized version of the received signal appears at the output 34 of the digitizer 32.

The alternate embodiment 31 includes a transformer 35, having an input and an output 36. The input of the transformer 35 is connected to the output 34 of the digitizer 32. The transformer 35 transforms the digitized signal to a companion signal that will be compared against the digitized signal to determine the coherence of the received signal. The transformed signal appears at the output 36 of the transformer 35. In the preferred embodiment, the transformer 35 is selected from the group of transformers consisting of Hilbert Transformer and Differentiator Transformer.

The alternate embodiment 31 includes a first squarer 37, having an input and an output 38. The input of the first squarer 37 is connected to the output 36 of the transformer 35. The first squarer 37 squares (i.e., raises to a power of two) the output 36 of the transformer 35. The squared version of the transformed signal appears at the output 38 of the first squarer 37.

The alternate embodiment 31 includes a second squarer 39, having an input and an output 40. The input of the second squarer 39 is connected to the output 34 of the digitizer 32. The second squarer 39 squares the output 34 of the digitizer 32. The squared version of the digitized signal appears at the output 40 of the second squarer 39.

The alternate embodiment 31 includes an adder 41, having a first input, a second input, and an output 42. The first input of the adder 41 is connected to the output 38 of the first squarer 37. The second input of the adder 41 is connected to the output 40 of the second squarer 39. The adder 41 adds the output 38 of the first squarer 37 and the output 40 of the second squarer. The resulting sum appears at the output 42 of the adder 41.

The alternate embodiment 31 includes a subtractor 43, having a first input, a second input, and an output 44. The first input of the subtractor 43 is connected to the output 38 of the first squarer 37. The second input of the subtractor 43 is connected to the output 40 of the second squarer 39. The subtractor 43 subtracts the squared transformed signal from the squared digitized signal. The resulting difference appears at the output 44 of the subtractor 43.

The alternate embodiment 31 includes a standard-deviation function block 45, having an input and an output 46. The input of the standard-deviation function block 45 is connected to the output 44 of the subtractor 43. The standard-deviation function block 45 determines the standard deviation of the output of the subtractor 43. The resulting standard deviation appears at the output 46 of the standard-deviation function block 45.

The alternate embodiment 31 includes a mean generator 47, having an input and an output 48. The input of the mean generator 47 is connected to the output 42 of the adder 41. The mean generator 47 determines the mean of the output 42 of the adder 41. The resulting mean appears at the output 48 of the mean generator 47.

The alternate embodiment 31 includes a first multiplier 49, having an input and an output 50. The input of the first multiplier 49 is connected to the output 46 of the standard-deviation function block 45. The first multiplier 49 multiplies the output of the standard-deviation function block 45 by the square root of two. The resulting product appears at the output 50 of the first multiplier 49.

The alternate embodiment 31 includes a divider 51, having a first input, a second input, and an output 52. The first input of the divider 51 is connected to the output 48 of the mean generator 47. The second input of the divider 51 is connected to the output 50 of the first multiplier 49. The divider 51 divides the output 48 of the mean generator 47 by the output 50 of the first multiplier 49. The resulting quotient, which is a measurement of the coherence present in the received signal, appears at the output 52 of the divider 51.

The alternate embodiment 31 includes a second multiplier 53, having an input and an output 54. The input of the second multiplier 53 is connected to the output 52 of the divider 51. The second multiplier 53 multiplies the output 52 of the divider 51 by 100. The product, which is the percentage of coherence present in the received signal, appears at the output 54 of the second multiplier.

Figure 3:
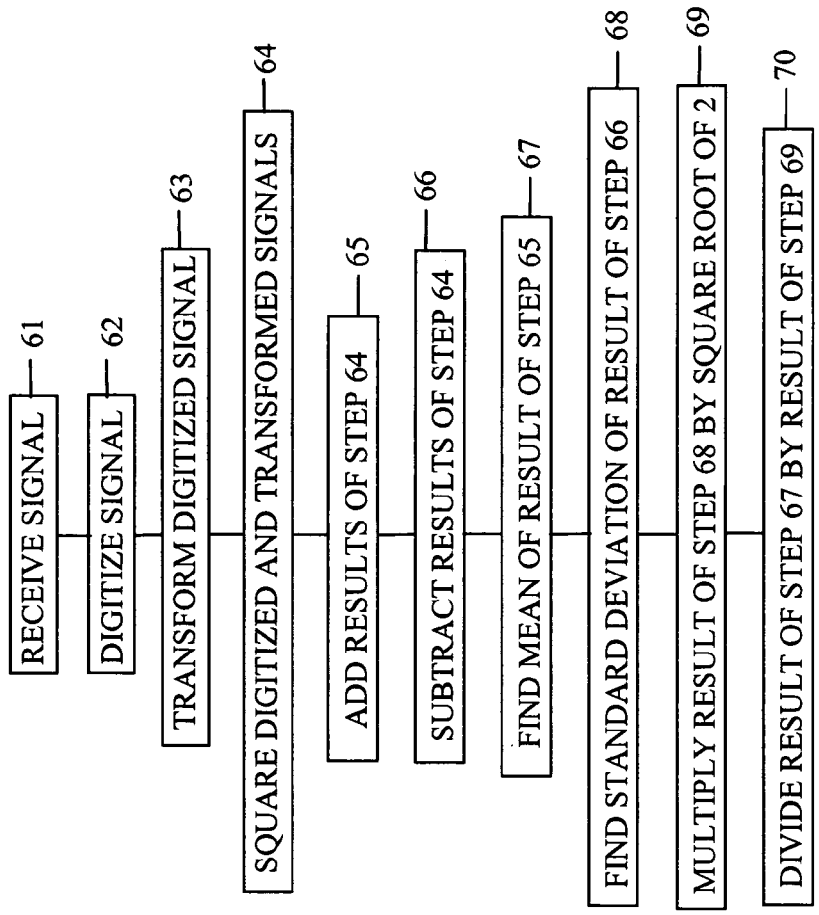
FIG. 3 is a flowchart of the method of the present invention.

FIG. 3 is a flow chart of the method of the present invention.

The first step 61 of the method is receiving a signal.

The second step 62 of the method is digitizing the received signal.

The third step 63 of the method is transforming the digitized signal. In the preferred embodiment, the signal is transformed using a transformation method selected from the group of transformation methods consisting of Hilbert Transformation and Differentiation Transformation.

The fourth step 64 of the method is squaring (i.e., raising to a power of two) the results of the second step 62 (i.e., squaring the digitized signal) and the third step 63 (i.e., squaring the transformed signal).

The fifth step 65 of the method is adding the results of the fourth step 64.

The sixth step 66 of the method is subtracting the results of the fourth step 64, where the result of squaring the transformed signal is subtracted from the result of squaring the digitized signal.

The seventh step 67 of the method is determining a mean value of the results of the fifth step 65.

The eighth step 68 of the method is determining a standard deviation of the results of the sixth step 66.

The ninth step 69 of the method is multiplying the results of the eighth step 68 by the square root of two.

The tenth, and last, step 70 of the method is dividing the result of the seventh step 67 by the result of the ninth step 69, where the result is a measurement of coherence in the received signal.

Figure 4:
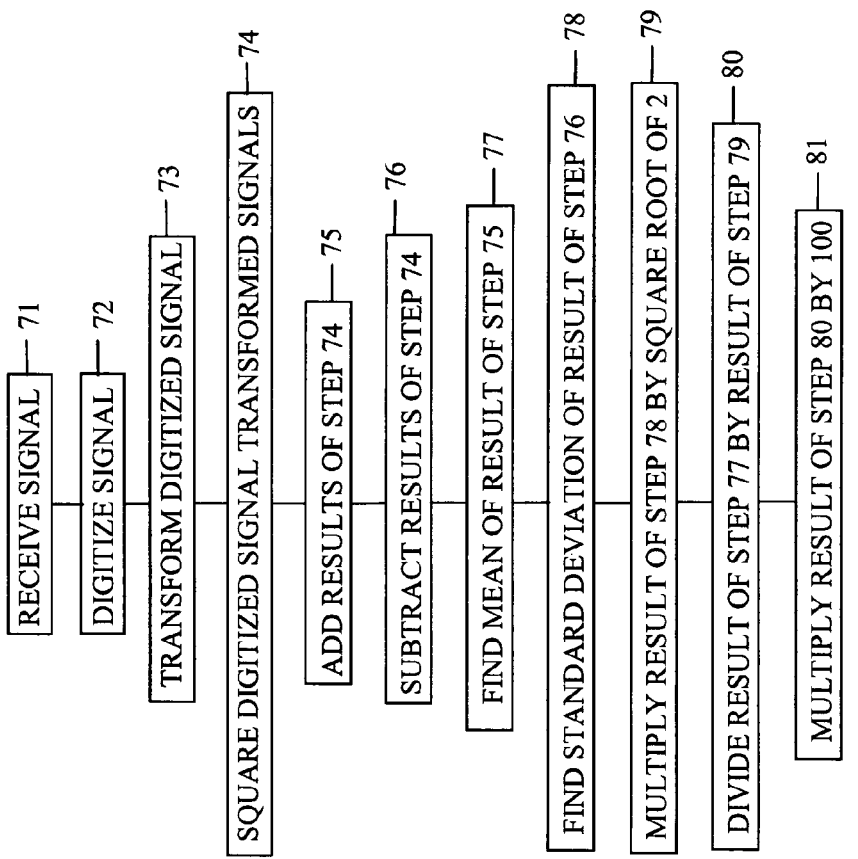
FIG. 4 is a flowchart of an alternate method of the present invention.

FIG. 4 is a flow chart of an alternate method of the present invention.

The first step 71 of the alternate method is receiving a signal.

The second step 72 of the alternate method is digitizing the received signal.

The third step 73 of the alternate method is transforming the digitized signal. In the preferred embodiment, the signal is transformed using a transformation method selected from the group of transformation methods consisting of Hilbert Transformation and Differentiation Transformation.

The fourth step 74 of the alternate method is squaring (i.e., raising to a power of two) the results of the second step 72 (i.e., squaring the digitized signal) and the third step 73 (i.e., squaring the transformed signal).

The fifth step 75 of the alternate method is adding the results of the fourth step 74.

The sixth step 76 of the alternate method is subtracting the results of the fourth step 74, where the result of squaring the transformed signal is subtracted from the result of squaring the digitized signal.

The seventh step 77 of the alternate method is determining a mean value of the results of the fifth step 75.

The eighth step 78 of the alternate method is determining a standard deviation of the results of the sixth step 76.

The ninth step 79 of the alternate method is multiplying the results of the eighth step 78 by the square root of two.

The tenth step 80 of the alternate method is dividing the result of the seventh step 77 by the result of the ninth step 79.

The eleventh, and last, step 81 of the alternate method is multiplying the result of the tenth step by 100, where the result is a measurement of coherence in the received signal.

What is claimed is:

1. A device for determining a coherence measurement for a signal, comprising:

a) a digitizer, having an input for receiving the signal, and having an output;
   b) a transformer, having an input connected to the output of the digitizer, and having an output;
   c) a first squarer, having an input connected to the output of the transformer, and having an output;
   d) a second squarer, having an input connected to the output of the digitizer, and having an output;
   e) an adder, having a first input connected to the output of the first squarer, having a second input connected to the output of the second squarer, and having an output;
   f) a subtractor, having a first input connected to the output of the first squarer, having a second input connected to the output of the second squarer, and having an output;
   g) a standard-deviation function block, having an input connected to the output of the subtractor, and having an output;
   h) a mean generator, having an input connected to the output of the adder, and having an output;
   i) a first multiplier, having an input connected to the output of the standard-deviation function block, and having an output;
   j) a divider, having a first input connected to the output of the mean generator, having a second input connected to the output of the first multiplier, and having an output; and
   k) further including a second multiplier, having an input connected to the output of the divider, and having an output.

2. The device of claim 1, wherein said second multiplier multiplies by one-hundred.

3. The device of claim 1, wherein said transformer is selected from the group of transformers consisting of Hilbert Transformer and Differentiator Transformer.

4. The device of claim 1, wherein said first multiplier multiplies by a square root of two.

* * * * *